(12) United States Patent
Wu et al.

(10) Patent No.: US 12,142,305 B1
(45) Date of Patent: Nov. 12, 2024

(54) DATA DELAY CELL FOR RISE TIME PROGRAMMING IN WRITE PREAMPLIFIER

(71) Applicant: Marvell Asia Pte Ltd, Singapore (SG)

(72) Inventors: Kai Wu, Singapore (SG); Devrishi Khanna, Singapore (SG); Lei Mei, Singapore (SG)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/467,292

(22) Filed: Sep. 14, 2023

Related U.S. Application Data

(60) Provisional application No. 63/407,613, filed on Sep. 16, 2022.

(51) Int. Cl.
*G11B 5/00* (2006.01)
*G11B 5/02* (2006.01)
(52) U.S. Cl.
CPC ..................... *G11B 5/022* (2013.01)
(58) Field of Classification Search
CPC ........... H03K 5/13; H03K 2005/00019; H03K 2005/00208; G11C 11/2293; G11C 11/4076; G11C 11/221; G11B 27/36; G11B 5/09; G11B 20/10; G11B 20/0212; G11B 20/0013; G11B 20/10222; G11B 5/00; G11B 2005/0018; G11B 20/10027
USPC ....................................... 360/67, 66
See application file for complete search history.

(56) References Cited

U.S. PATENT DOCUMENTS 7,061,307 B2 * 6/2006 Iroaga ................... H03L 7/0891
330/288

* cited by examiner

*Primary Examiner* — Nabil Z Hindi

(57) ABSTRACT

A data delay circuit, for delaying a portion of a data signal for application to a write head of a hard disk drive, includes a data delay cell including two inverters and a charge current source for charging at least one of the inverters, and a bias circuit for programming delay of the data delay cell. The bias circuit is in current-mirroring relationship with the charge current source and includes a current-based digital-to-analog converter (DAC) for programmably selecting the delay of the data delay cell, and a reference current source for the DAC. The data delay cell and the bias circuit are subject to gain error, and the data delay circuit further includes compensation circuitry for reducing the effect of the gain error. The compensation circuitry may include replica charge current and reference current sources that are fed back through a gain cell.

18 Claims, 8 Drawing Sheets

DATA DELAY CELL FOR RISE TIME PROGRAMMING IN WRITE PREAMPLIFIER

CROSS REFERENCE TO RELATED APPLICATION

This disclosure claims the benefit of commonly-assigned U.S. Provisional Patent Application No. 63/407,613, filed Sep. 16, 2022, which is hereby incorporated by reference herein in its entirety.

FIELD OF USE

This disclosure relates to controlling the rise time of the write current in a write preamplifier of a hard disk drive. More particularly, this disclosure relates to controlling the delay of a delay cell that is used to control the rise time of the write current.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In order to accurately write data to a hard disk drive, the write current, $I_w$, and particularly the rise time of $I_w$, should be accurately controlled. One way to control the rise time of $I_w$ is to divide the total $I_w$ increase into steps, and to delay each step relative the previous step by a controlled amount. Each delay is commonly programmably controlled by a current from a bias circuit based on a programmable current-based digital-to-analog converter ("current DAC" or "$I_{DAC}$"). However, current mirror circuitry in the bias circuit may introduce an error current having a magnitude between 15% and 35% of the target current that controls the delay. The resulting current error can affect the rise time of the write current.

SUMMARY

In accordance with implementations of the subject matter of this disclosure, a data delay circuit, for delaying a portion of a data signal for application to a write head of a hard disk drive, includes a data delay cell including two inverters and a charge current source for charging at least one of the inverters, and a bias circuit for programming delay of the data delay cell, the bias circuit being in current-mirroring relationship with the charge current source and including a current-based digital-to-analog converter for programmably selecting the delay of the data delay cell, and a reference current source for the current-based digital-to-analog converter. The data delay cell and the bias circuit are subject to gain error, and the data delay circuit further includes compensation circuitry for reducing the effect of the gain error.

In a first implementation of such a data delay circuit, the compensation circuitry may be coupled to the bias circuit.

According to a first aspect of the first implementation, the compensation circuitry may include a replica of the charge current source, a replica of the reference current source, and a gain cell. Output of the replica of the charge current source may be combined with output of the replica of the reference current source and the combined replica currents may be fed back through the gain cell to be combined with output of the reference current source for input to the charge current source.

In a first instance of the first aspect, increasing gain of the gain cell may decrease effect of the gain error in the data delay cell and the bias circuit.

In a first variation of the first instance, the gain of the gain cell may be at least 15.

In a first alternative of the first variation, the gain of the gain cell may be between 15 and 25.

In a second instance of the first aspect, the data delay circuit may be a differential circuit, and each of (a) the bias circuit, (b) the charge current source, (c) the reference current source, (d) the replica of the charge current source, (e) the replica of the reference current source, and (f) the gain cell, may have a respective positive-leg portion and a respective negative-leg portion.

In a second implementation of such a data delay circuit, the compensation circuitry may include a temperature compensation element.

According to a first aspect of the second implementation, the temperature compensation element may be a proportional-to-absolute-temperature current source in parallel with the reference current source.

In accordance with implementations of the subject matter of this disclosure, a method for delaying a portion of a data signal, for application to a write head of a hard disk drive, includes passing the data signal through a data delay cell including two inverters and a charge current source for charging at least one of the inverters, and programming delay of the data delay cell using a bias circuit in current-mirroring relationship with the charge current source and including (a) a current-based digital-to-analog converter for programmably selecting the delay of the data delay cell, and (b) a reference current source for the current-based digital-to-analog converter. The data delay cell and the bias circuit are subject to gain error, and the method further includes applying compensation to reduce the effect of the gain error.

In a first implementation of such a method, applying compensation may include applying compensation to the bias circuit.

According to a first aspect of the first implementation, applying compensation may include combining a replica of the charge current with a replica of the reference current, and feeding back the combined replica currents through a gain cell to be combined with the reference current for input to the charge current source.

In a first instance of the first aspect, increasing gain of the gain cell may decrease effect of the gain error in the data delay cell and the bias circuit.

A first variation of the first instance may include setting the gain of the gain cell to at least 15.

A first alternative of the first variation may include setting the gain of the gain cell to between 15 and 25.

In a second instance of the first aspect, when each of (a) the bias circuit, (b) the charge current source, (c) the reference current source, (d) the replica of the charge current source, (e) the replica of the reference current source, and (f) the gain cell, has a respective positive-leg portion and a respective negative-leg portion, combining a replica of the charge current with a replica of the reference current may include combining each respective leg of the replica of the charge current with a respective leg of the replica of the reference current, and feeding back the combined replica currents through a gain cell to be combined with the reference current for input to the charge current source may include feeding back each respective leg the combined replica currents through a respective leg of the gain cell to be combined with the respective leg of the reference current for input to the respective leg of the charge current source.

In a second implementation of such a method, applying compensation to reduce the effect of the gain error may include applying temperature compensation.

According to a first aspect of the second implementation, applying temperature compensation may include applying a proportional-to-absolute-temperature current in parallel with the reference current.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, in order to accurately write data to a hard disk drive, the write current, $I_w$, and particularly the rise time of $I_w$, should be accurately controlled. One way to control the rise time of $I_w$ is to divide the total $I_w$ increase, corresponding to a data pulse to be written, into steps, and to delay each step relative the previous step by a controlled amount. Each step delay may be controlled by a delay cell, which may be inverter based.

The amount of delay is commonly controlled by charging the inverters in the delay cell with a current from a bias circuit, which may be based on a programmable current-based digital-to-analog converter ("current DAC" or "$I_{DAC}$"). The digital input to the current DAC may be controlled to program the delay by controlling the output current of the current DAC. However, because of process and temperature variations, current mirror circuitry in the bias circuit may introduce an error current having a magnitude between 15% and 35% of the target current that controls the delay, resulting in an error in the delay.

In accordance with implementations of the subject matter of this disclosure, error in the current that controls each step delay may be reduced by providing a compensation circuit in the bias circuit. Conceptually, if the bias circuit is considered as including a reference current source, $I_{ref}$, and a charging current source, $I_{out}$, then the compensation circuit may be considered to have a replica reference current source and a replica charging current source, as well as a gain cell. The replica reference current is subtracted from the replica charging current, and that difference current is passed through the gain cell. The gain cell output is then subtracted from the original reference current, $I_{ref}$, and the reduced reference current is fed back to the original charging current source.

If the error "gain" in the bias circuit is denoted as a (as noted above, a may be between about 15% and about 35%—i.e., between about 0.15 and about 0.35), and the gain of the gain cell is denoted as A, it may be established that $$I_{out}=I_{ref}(1+(a/(1+A+aA)))$$

As A is made larger, $a/(1+A+aA) \to 0$, so that $I_{out} \to I_{ref}$ as desired. In some implementations, A may be between about 15 and about 25. Taking the extremes, for a=0.15 and A=25, $a/(1+A+aA)=0.0050$, while for a=0.35 and A=15, $a/(1+A+aA)=0.0165$. Thus, even for A=15, the error is below 2%, and the error decreases to well under 18 for higher values of A.

In addition, as noted above, the current error results in part from temperature variations. Therefore, a PTAT (proportional-to-absolute-temperature) current, $I_{PTAT}$, may be added to the reference current to provide additional correction.

The subject matter of this disclosure may be better understood by reference to FIGS. 1-10.

Figure 1:
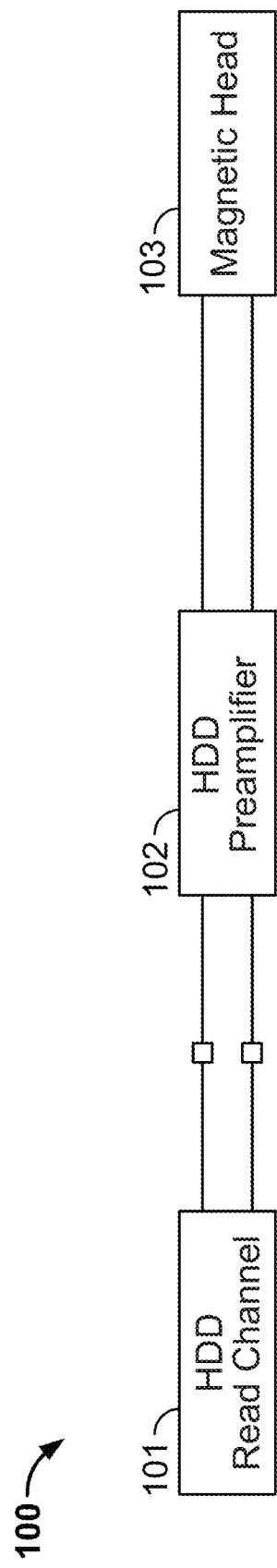
FIG. 1 is a block diagram of writing circuitry for a hard disk drive, with which implementations of the subject matter of this disclosure may be used.
Figure 2:
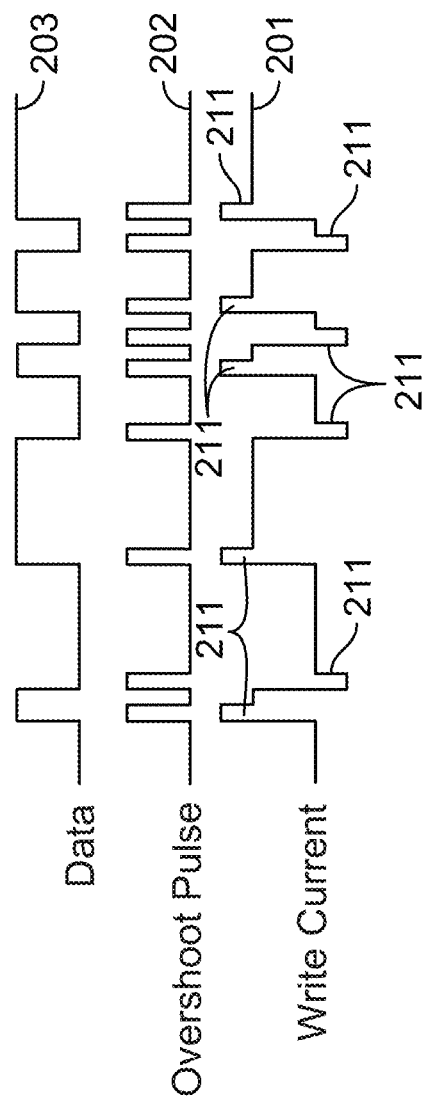
FIG. 2 shows write current waveforms for use in implementations of the subject matter of this disclosure.

Typical writing circuitry 100 for a hard disk drive may be seen in FIG. 1. Read/write channel circuitry 101 outputs signals 111, representing data to be written, to preamplifier circuitry 102, which generates write current signals 201 (FIG. 2) for magnetic head 103. Write current signals 201 which, by design, include overshoot pulses 211 on the initial rise from zero and when returning to zero, are generated by applying overshoot signal 202 to data signal 203. In order to achieve the desired write current profile 201, accurate control of the rise time of data signal 203 is important.

Figure 3:
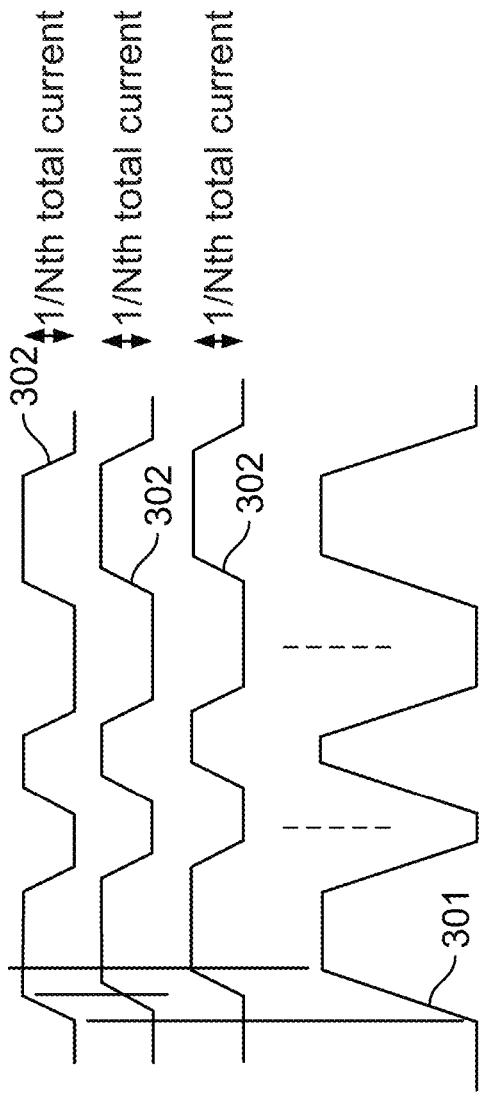
FIG. 3 shows waveforms illustrating the breaking down, into steps, of write current rise in implementations of the subject matter of this disclosure.
Figure 4:
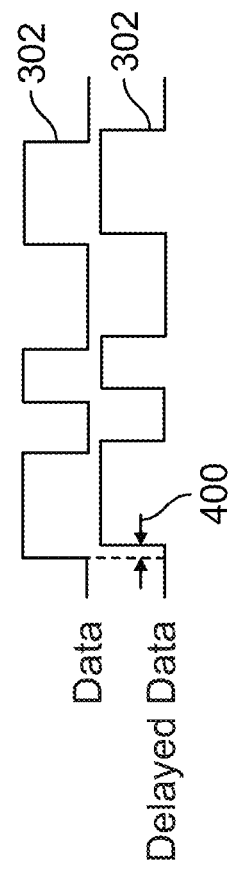
FIG. 4 shows how successive steps of FIG. 3 may be delayed relative to one another in implementations of the subject matter of this disclosure.

One way to achieve accurate rise time control is to divide the total signal rise into steps. As seen in FIG. 3, the total current rise TR (301) may be divided into N steps 302, each of magnitude TR/N. If each step 302 is delayed by the proper amount 400 (FIG. 4) relative to the previous step, each current step will add smoothly to the previous step for a smooth total rise 301 in the desired total rise time.

Figure 5:
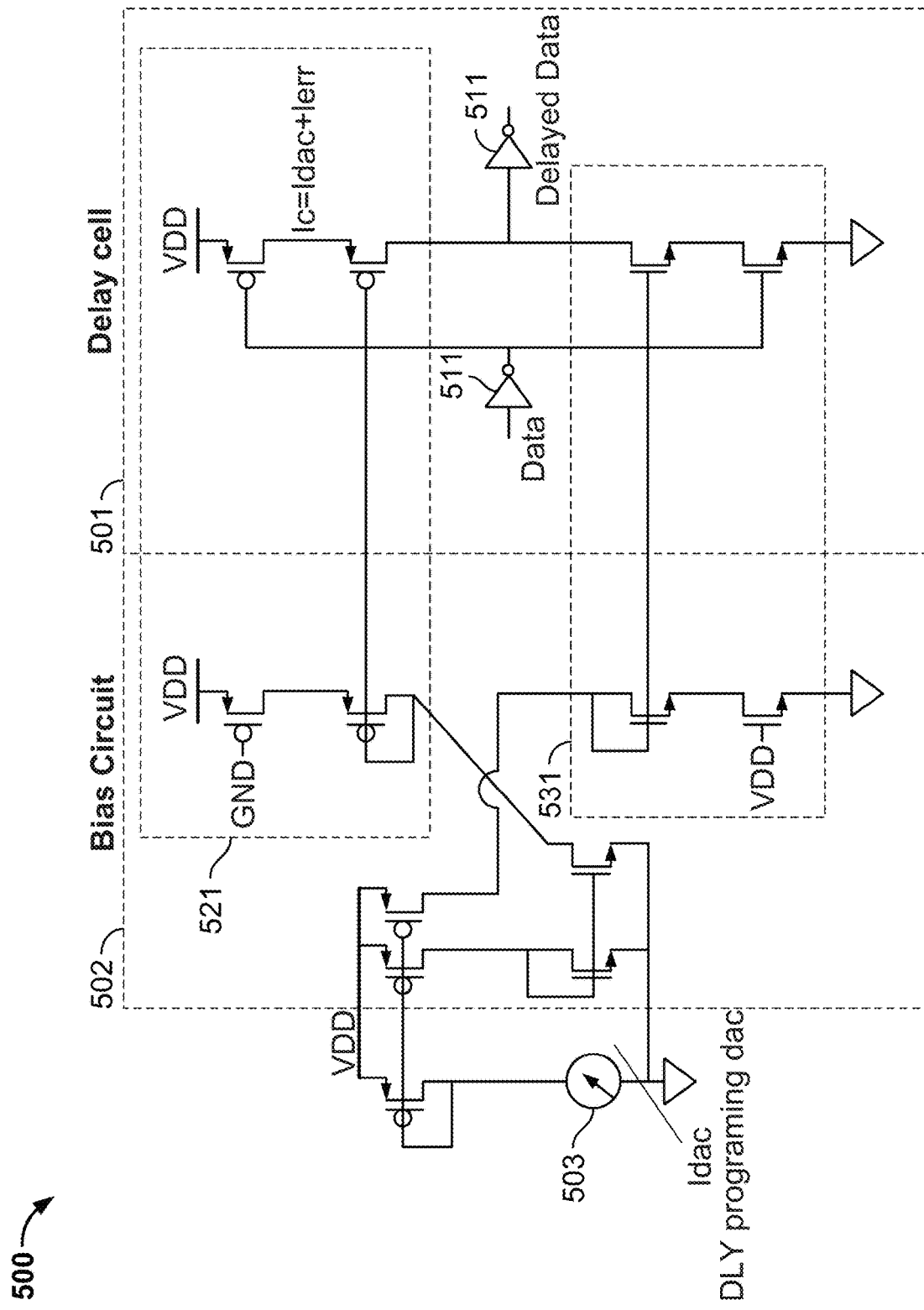
FIG. 5 is a schematic diagram of circuitry for delaying each step.

Typical circuitry 500 for delaying each step is shown in FIG. 5. Circuitry 500, which may be repeated N times, may reside in preamplifier circuitry 102 and may include a delay cell 501 based on two cascaded inverters 511, charged by differential current mirror circuitry 521 (for the positive leg) and 531 (for the negative leg), which is formed from portions of delay cell 501 and bias circuit 502. The amount of delay is determined by the charging current $I_c$, which is mirrored from bias circuit 502 and is in turn determined by current DAC 503. As is known, a current DAC processes a number of bits at a time, and may be considered as a set of parallel switches (not shown), one for each bit, which are set according to the input word which may be considered as a programmed input code. The current DAC output is a current whose magnitude is equal to the product of the input code, the magnitude of the input reference current, and a weighting factor that is characteristic of the DAC. Setting the DAC input code thus sets the charging current $I_c$, to control the delay of delay cell 501, which is inversely proportional to charging current $I_c$.

For delay cell 501 to retain the duty cycle and jitter characteristics of the data path, the components of delay cell 501 and bias circuit 502 typically are fabricated with minimum geometries. However, that may give rise to error in the mirrored charging current. The magnitude of the error is subject to process and temperature variations.

Figure 6:
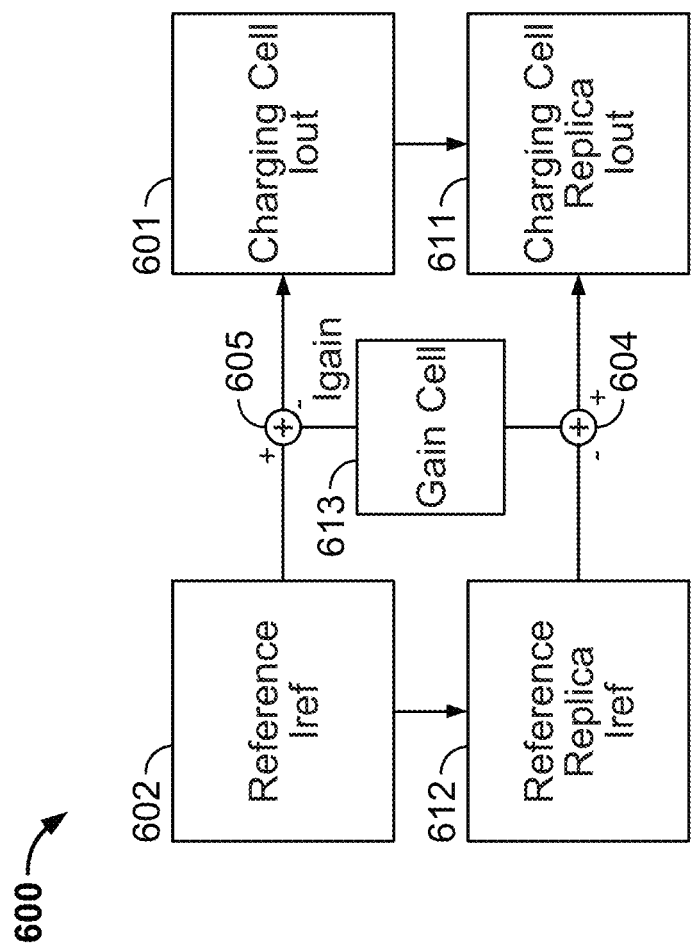
FIG. 6 is a block diagram of circuitry according to implementations of the subject matter of this disclosure to reduce the error in the delay, and therefore in the write current rise time.

A high-level diagram of circuitry 600 according to implementations of the subject matter of this disclosure to reduce the error in the charging current, which would lead to error in the delay and therefore in the write current rise time, is shown in FIG. 6. The output charging current $I_{out}$ is generated by charging cell 601 (which has "error gain" (1+a)), based on reference current $I_{ref}$ generated by reference cell 602. Circuitry 600 also includes a replica charging cell 611 and a replica reference cell 612, as well as a gain cell 603 having gain A. The replica reference current $I_{ref'}$ is subtracted from the replica output charging current $I_{out'}$ at 604, and the result is multiplied by A in gain cell 603 to yield gain current $I_{gain}$ 613, which is combined with $I_{ref}$ at 605 and fed back to charging cell 601. The following relationships flow from this architecture:

$$I_{gain}=(I_{out}-I_{ref})\times A$$

$$=(I_{ref}-I_{gain})\times(1+a)$$

Solving for $I_{out}$ in terms of $I_{ref}$ yields:

$$I_{out}=I_{ref}\times(1+(a/(1+A+aA)))$$

As noted above, as A becomes larger, $a/(1+A+aA)\to 0$, so that $I_{out}\to I_{ref}$ as desired. In some implementations, A may be between about 15 and about 25. Recalling that a may be between 0.15 and 0.35, and taking the extremes, for a=0.15 and A=25, a/(1+A+aA)=0.0050, while for a=0.35 and A=15, a/(1+A+aA)=0.0165. Thus, even for A=15, the error is below 2%, and the error decreases for higher values of A to well under 1%.

Figure 7:
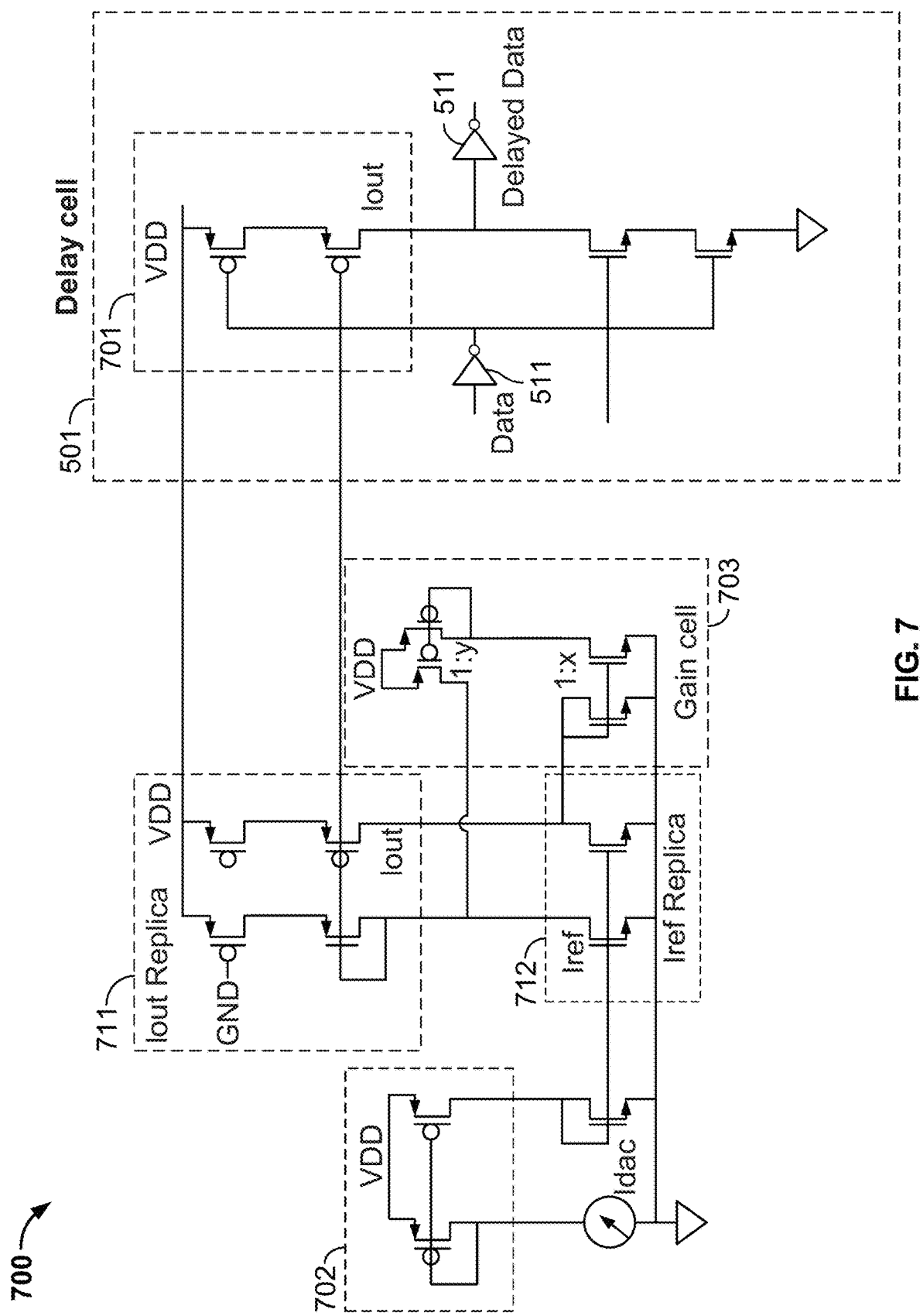
FIG. 7 is a schematic diagram of compensation circuitry for the positive leg of a differential delay signal in accordance with implementations of the subject matter of this disclosure.
Figure 8:
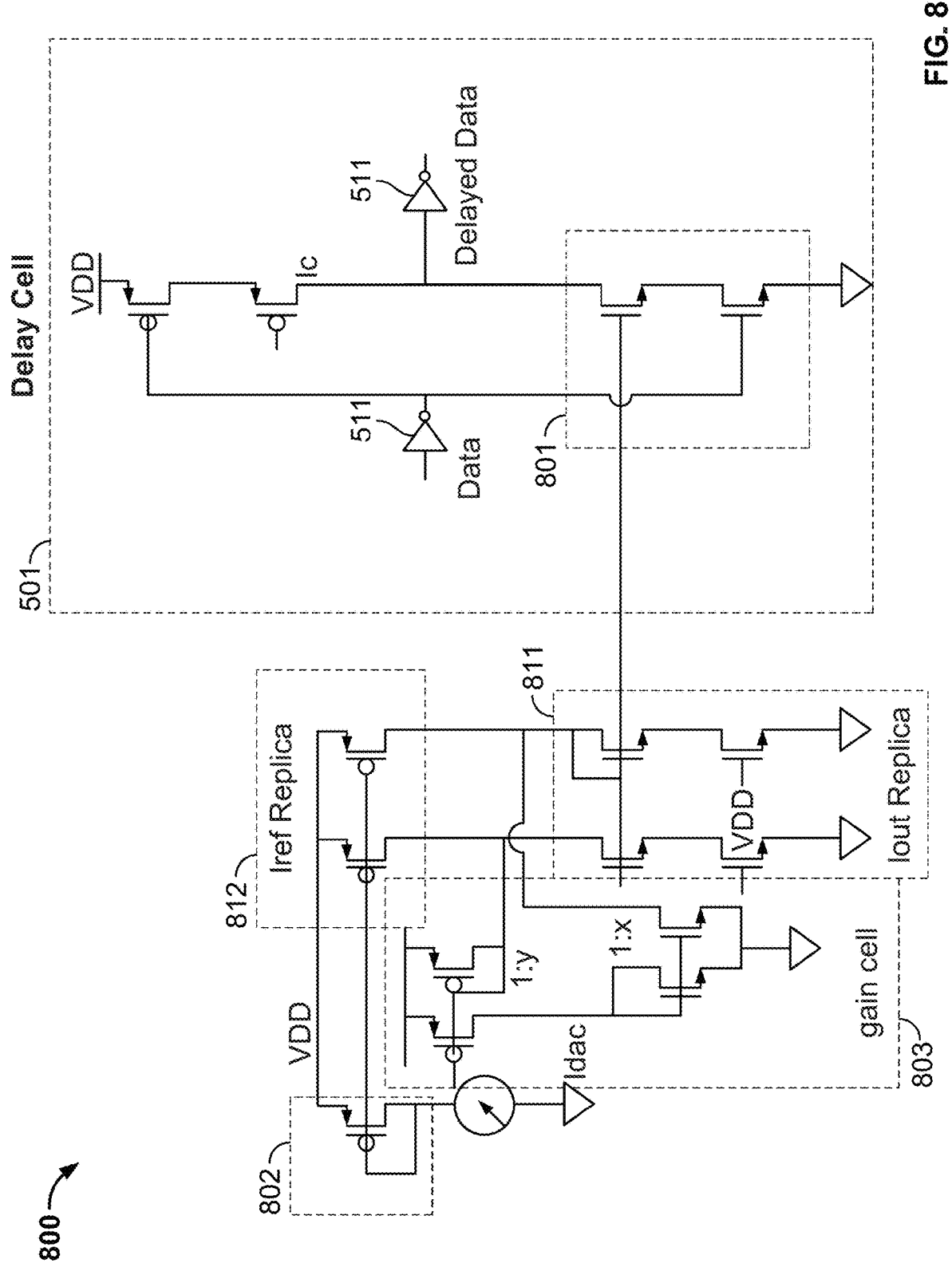
FIG. 8 is a schematic diagram of compensation circuitry for the negative leg of a differential delay signal in accordance with implementations of the subject matter of this disclosure.
Figure 9:
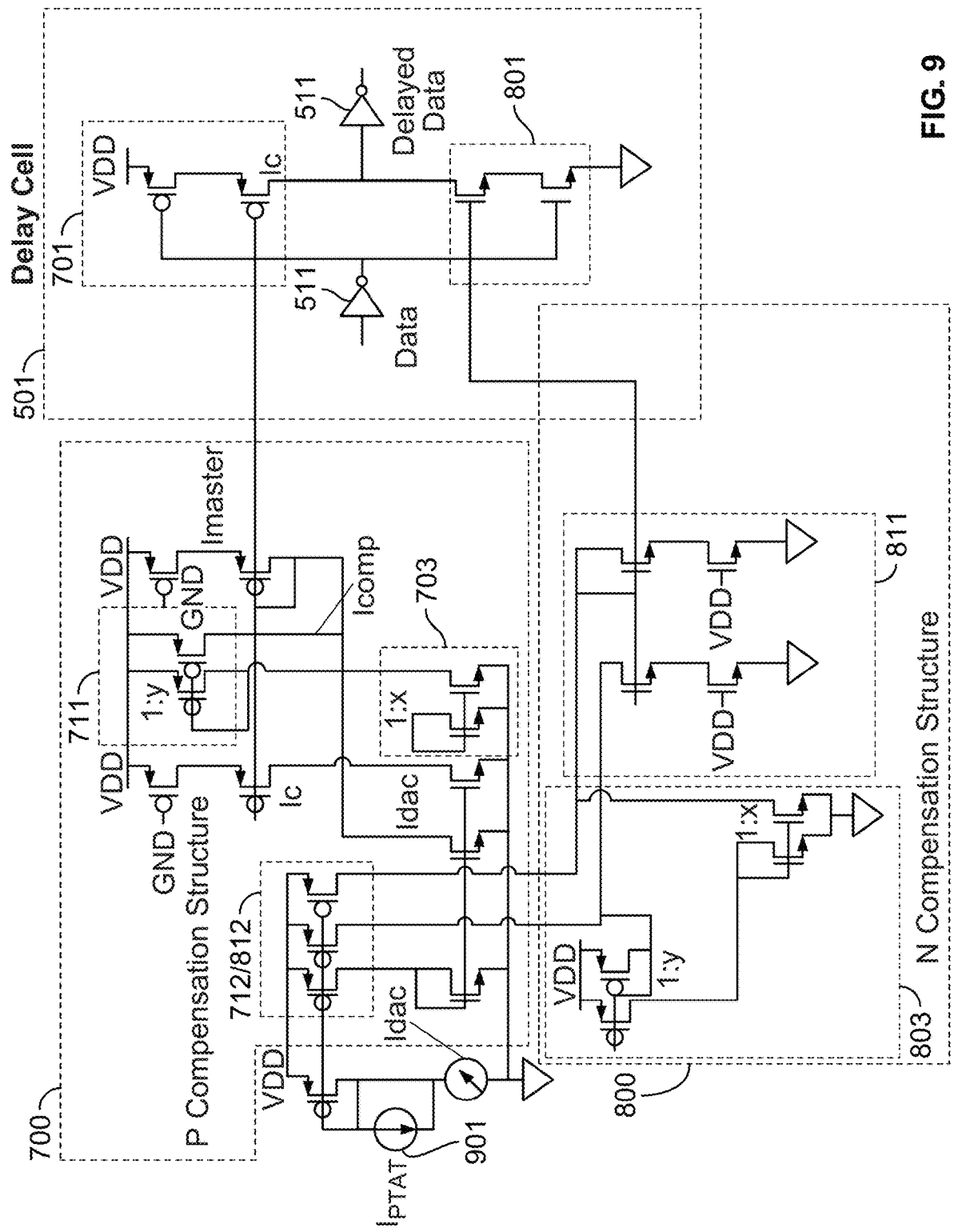
FIG. 9 is a schematic diagram of combined compensation circuitry for both legs of a differential delay signal in accordance with implementations of the subject matter of this disclosure.

A circuit implementation of compensation architecture 600 as applied to data delay circuitry 500 is illustrated in FIGS. 7-9. In order to simplify the representation, the compensation circuitry for the positive (P) leg is shown in FIG. 7 separately from the compensation circuitry for the negative (N) leg, which is shown in FIG. 8. The combined structure is shown in FIG. 9.

As seen in FIG. 7, the P-leg $I_{out}$ circuit 701 is replicated as $I_{out}$ replica circuit 711, while the P-leg $I_{ref}$ circuit 702 is replicated as $I_{ref}$ replica circuit 712. Gain cell 703 has gain A where A=xy. As seen in FIG. 8, the N-leg $I_{out}$ circuit 801 is replicated as Tout replica circuit 811, while the N-leg $I_{ref}$ circuit 802 is replicated as $I_{ref}$ replica circuit 812. Gain cell 803 has gain A where A=xy. The combined structure is shown in FIG. 9.

As noted above, the current error results in part from temperature variations. Therefore, a PTAT (proportional-to-absolute-temperature) current source $I_{PTAT}$ (901) may be added optionally in parallel with the current DAC reference current to provide additional correction. Because the delay is inversely proportional to charging current $I_c$, increasing charging current $I_c$ by adding $I_{PTAT}$ reduces the delay, thereby shortening the rise time. For example, without temperature correction, a digital delay cell may provide, in some implementations, a 100 ps rise time at 25° C. but 110 ps rise time at 135° C. Introducing the PTAT current source $I_{PTAT}$ (901) can provide a 100 ps rise time at 135° C., practically eliminating the temperature variation in that implementation.

Figure 10:
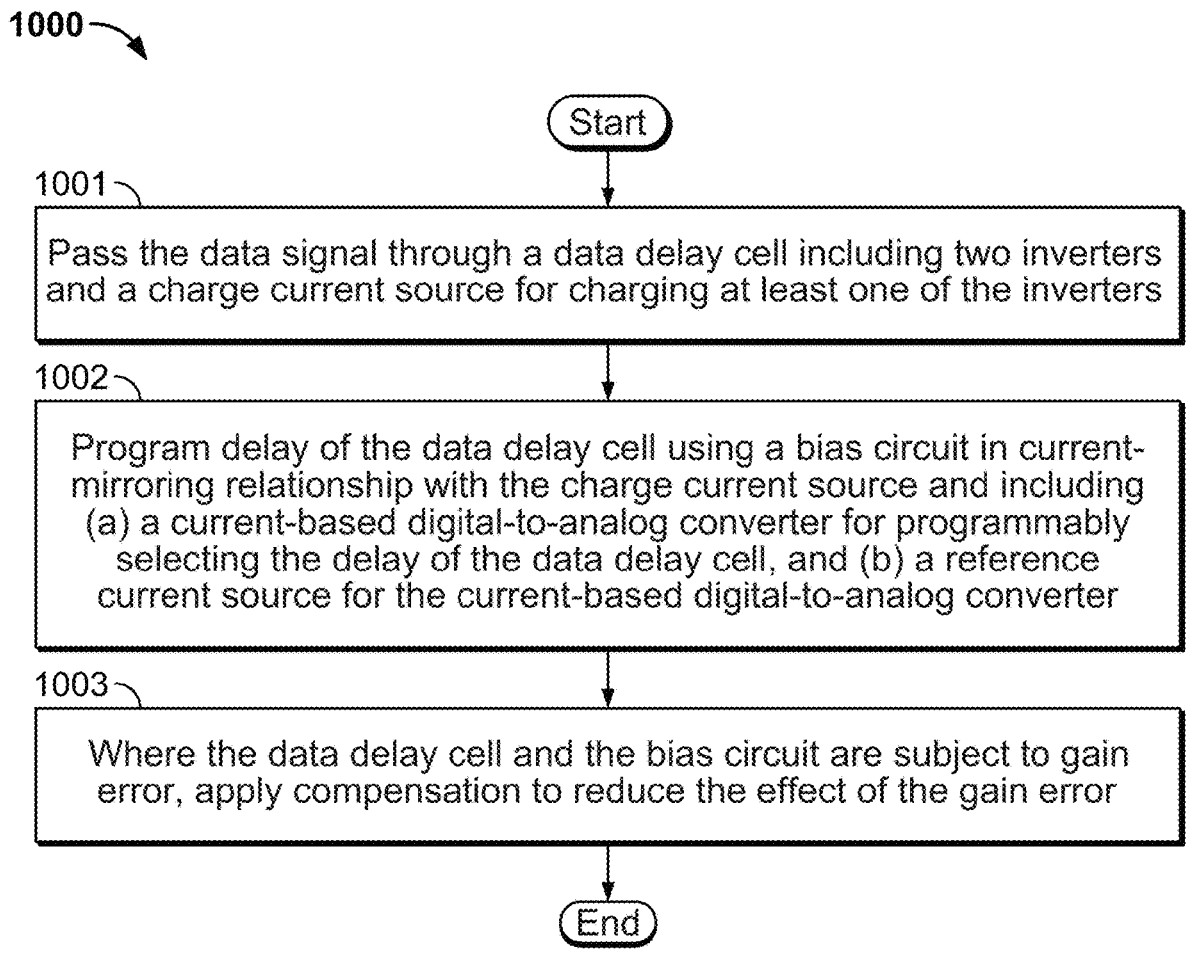
FIG. 10 is a flow diagram illustrating implementations of a method in accordance with the subject matter of this disclosure.

A method 1000 in accordance with the subject matter of this disclosure, for delaying a portion of a data signal for application to a write head of a hard disk drive, is diagrammed in FIG. 10. Method 1000 begins at 1001, where a data signal is passed through a data delay cell including two inverters and a charge current source for charging at least one of the inverters. At 1002, delay of the data delay cell is programmed using a bias circuit in current-mirroring relationship with the charge current source and including (a) a current-based digital-to-analog converter for programmably selecting the delay of the data delay cell, and (b) a reference current source for the current-based digital-to-analog converter. At 1003, where the data delay cell and the bias circuit are subject to gain error, compensation is applied to reduce the effect of the gain error. Method 1000 then ends.

Thus it is seen that a method and apparatus for controlling the delay of a delay cell that is used to control the rise time of the write current in a write preamplifier of a hard disk drive, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A data delay circuit for delaying a portion of a data signal for application to a write head of a hard disk drive, the data delay circuit comprising:
   a data delay cell including two inverters and a charge current source for charging at least one of the inverters; and
   a bias circuit for programming delay of the data delay cell, the bias circuit being in current-mirroring relationship with the charge current source and including a current-based digital-to-analog converter for programmably selecting the delay of the data delay cell, and a reference current source for the current-based digital-to-analog converter; wherein:
   the data delay cell and the bias circuit are subject to gain error; the data delay circuit further comprising:
   compensation circuitry for reducing the effect of the gain error.

2. The data delay circuit of claim 1 wherein the compensation circuitry is coupled to the bias circuit.

3. The data delay circuit of claim 2 wherein the compensation circuitry comprises:
   a replica of the charge current source;
   a replica of the reference current source; and
   a gain cell; wherein:
   output of the replica of the charge current source is combined with output of the replica of the reference current source and the combined replica currents are fed back through the gain cell to be combined with output of the reference current source for input to the charge current source.

4. The data delay circuit of claim 3 wherein increasing gain of the gain cell decreases effect of the gain error in the data delay cell and the bias circuit.

5. The data delay circuit of claim 4 wherein the gain of the gain cell is at least 15.

6. The data delay circuit of claim 5 wherein the gain of the gain cell is between 15 and 25.

7. The data delay circuit of claim 3 wherein:
the data delay circuit is a differential circuit; and
each of (a) the bias circuit, (b) the charge current source, (c) the reference current source, (d) the replica of the charge current source, (e) the replica of the reference current source, and (f) the gain cell, has a respective positive-leg portion and a respective negative-leg portion.

8. The data delay circuit of claim 1 wherein the compensation circuitry comprises a temperature compensation element.

9. The data delay circuit of claim 8 wherein the temperature compensation element is a proportional-to-absolute-temperature current source in parallel with the reference current source.

10. A method for delaying a portion of a data signal for application to a write head of a hard disk drive, the method comprising:
passing the data signal through a data delay cell including two inverters and a charge current source for charging at least one of the inverters; and
programming delay of the data delay cell using a bias circuit in current-mirroring relationship with the charge current source and including (a) a current-based digital-to-analog converter for programmably selecting the delay of the data delay cell, and (b) a reference current source for the current-based digital-to-analog converter; wherein:
the data delay cell and the bias circuit are subject to gain error; the method further comprising:
applying compensation to reduce the effect of the gain error.

11. The method according to claim 10 for delaying the portion of the data signal, wherein applying compensation comprises applying compensation to the bias circuit.

12. The method according to claim 11 for delaying the portion of the data signal, wherein applying compensation comprises:
combining a replica of the charge current with a replica of the reference current; and
feeding back the combined replica currents through a gain cell to be combined with the reference current for input to the charge current source.

13. The method according to claim 12 for delaying the portion of the data signal, wherein increasing gain of the gain cell decreases effect of the gain error in the data delay cell and the bias circuit.

14. The method according to claim 13 for delaying the portion of the data signal, comprising setting the gain of the gain cell to at least 15.

15. The method according to claim 14 for delaying the portion of the data signal, comprising setting the gain of the gain cell to between 15 and 25.

16. The method according to claim 12 for delaying the portion of the data signal, wherein, when each of (a) the bias circuit, (b) the charge current source, (c) the reference current source, (d) the replica of the charge current source, (e) the replica of the reference current source, and (f) the gain cell, has a respective positive-leg portion and a respective negative-leg portion:
combining a replica of the charge current with a replica of the reference current comprises combining each respective leg of the replica of the charge current with a respective leg of the replica of the reference current; and
feeding back the combined replica currents through a gain cell to be combined with the reference current for input to the charge current source comprises feeding back each respective leg the combined replica currents through a respective leg of the gain cell to be combined with the respective leg of the reference current for input to the respective leg of the charge current source.

17. The method according to claim 10 for delaying the portion of the data signal, wherein applying compensation to reduce the effect of the gain error comprises applying temperature compensation.

18. The method according to claim 17 for delaying the portion of the data signal, wherein applying temperature compensation comprises applying a proportional-to-absolute-temperature current in parallel with the reference current.

* * * * *